United States Patent
Ben-Yehuda et al.

(10) Patent No.: US 10,643,161 B2
(45) Date of Patent: May 5, 2020

(54) REGULATING APPLICATION TASK DEVELOPMENT

(71) Applicant: ENTIT SOFTWARE LLC, Sanford, NC (US)

(72) Inventors: Itay Ben-Yehuda, Yehud (IL); Ronen Shmiel, Yehud (IL); Nir Yom Tov, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 142 days.

(21) Appl. No.: 14/646,961

(22) PCT Filed: Nov. 28, 2012

(86) PCT No.: PCT/US2012/066813
§ 371 (c)(1),
(2) Date: May 22, 2015

(87) PCT Pub. No.: WO2014/084820
PCT Pub. Date: Jun. 5, 2014

(65) Prior Publication Data
US 2015/0324723 A1   Nov. 12, 2015

(51) Int. Cl.
*G06F 9/44* (2018.01)
*G06Q 10/06* (2012.01)
(Continued)

(52) U.S. Cl.
CPC ......... *G06Q 10/06316* (2013.01); *G06F 8/20* (2013.01); *G06F 8/77* (2013.01)

(58) Field of Classification Search
CPC ....... G06Q 10/06316; G06F 8/77; G06F 9/44; G06F 9/4881; G06F 9/4843
See application file for complete search history.

(56) References Cited

U.S. PATENT DOCUMENTS 5,812,780 A * 9/1998 Chen ..................... G06F 11/261
  709/224
6,408,403 B1 * 6/2002 Rodrigues ........... G06F 11/3688
  714/38.11
(Continued)

FOREIGN PATENT DOCUMENTS

CN    102111337 B    6/2011

OTHER PUBLICATIONS

Supplemental European Search Report, European Patent Application No. 12889336.9, dated Mar. 9, 2016, 8 pages.
(Continued)

*Primary Examiner* — Lewis A Bullock, Jr.
*Assistant Examiner* — Tina Huynh

(57) ABSTRACT

A technique includes receiving a plurality of metrics for a plurality of tasks associated with developing an application, where each of the metrics is associated with one of the tasks and indicates a progress of the associated task. The technique includes receiving weights, where each weight is associated with one of the tasks and indicates a user assigned importance of the associated task. The technique includes displaying with the tool an indicator to allow regulation of task development, where the displaying includes causing the tool to prioritize the tasks for future development of the application based at least in part on the metrics and the weights.

10 Claims, 4 Drawing Sheets

(51) Int. Cl.
*G06F 8/77* (2018.01)
*G06F 8/20* (2018.01)

(56) References Cited

U.S. PATENT DOCUMENTS

| | | | |
|---|---|---|---|
| 8,006,222 B2 | 8/2011 | Ruhe | |
| 8,677,315 B1* | 3/2014 | Anderson | G06F 8/60 717/101 |
| 9,280,386 B1* | 3/2016 | Hagmann | G06F 9/4881 |
| 2003/0204836 A1* | 10/2003 | Srivastava | G06F 11/3676 717/124 |
| 2006/0015542 A1* | 1/2006 | Pommerenk | G06F 11/1469 |
| 2006/0107268 A1* | 5/2006 | Chrabieh | G06F 9/4881 718/100 |
| 2006/0123389 A1* | 6/2006 | Kolawa | G06F 11/3616 717/101 |
| 2006/0184409 A1 | 7/2006 | Bangel et al. | |
| 2007/0067145 A1* | 3/2007 | Miller | G06Q 10/06 703/6 |
| 2007/0168918 A1 | 7/2007 | Metherall et al. | |
| 2007/0266368 A1 | 11/2007 | Szpak et al. | |
| 2008/0256392 A1* | 10/2008 | Garland | G06F 11/263 714/33 |
| 2009/0064322 A1* | 3/2009 | Finlayson | G06F 21/6218 726/21 |
| 2009/0070734 A1* | 3/2009 | Dixon | G06F 8/71 717/102 |
| 2009/0089795 A1 | 4/2009 | Yoshida et al. | |
| 2009/0133027 A1* | 5/2009 | Gunning | G06Q 10/06 718/103 |
| 2009/0265681 A1* | 10/2009 | Beto | G06F 11/3672 717/100 |
| 2009/0288087 A1* | 11/2009 | Ringseth | G06F 9/4881 718/102 |
| 2010/0115523 A1* | 5/2010 | Kuschel | G06Q 10/06 718/103 |
| 2011/0071869 A1* | 3/2011 | O'Brien | G06Q 10/06 705/7.12 |
| 2011/0191303 A1 | 8/2011 | Kaufman et al. | |
| 2011/0289475 A1 | 11/2011 | Sukhenko et al. | |
| 2012/0036085 A1* | 2/2012 | Srivastava | G06Q 10/067 705/348 |
| 2012/0216207 A1* | 8/2012 | Krishnakumar | G06F 9/4881 718/103 |
| 2012/0278194 A1* | 11/2012 | Dewan | G06F 11/0742 705/26.1 |
| 2012/0304157 A1* | 11/2012 | Kawashima | G06F 11/3692 717/131 |
| 2012/0324379 A1* | 12/2012 | Bertram | G06F 9/45512 715/764 |
| 2013/0159774 A1* | 6/2013 | Budnik | G06F 11/3688 714/33 |
| 2013/0179109 A1* | 7/2013 | Buckhurst | G01R 31/2834 702/121 |
| 2014/0053127 A1* | 2/2014 | Madison | G06F 8/30 717/103 |

OTHER PUBLICATIONS

Boas, A., "Express—Agile Project Management," Methods & Tools, Spring 2010, retrieved from the internet on Oct. 11, 2012, 5 pages, available at http://www.methodsandtools.com/tools/tools.php?express.
Dillard, J. et al., "From Amorphous to Defined:Balancing the Risks of Spiral Development," (Research Paper), Apr. 30, 2007, 156 pages.
International Search Report & Written Opinion received in PCT Application No. PCT/US2012/066813, dated Jul. 15, 2013, 9 pages.
Product Arts, "Agile Requirements—So What's Different?" 2009, 3 pages, available at http://www.product-arts.com/resourcemain/articlemenu/2011-agile-requirements-so-whats-different.
International Preliminary Report on Patentability received in PCT Application No. PCT/US2012/066813, dated Jun. 11, 2015, 6 pages.
China Office Action for Application No. 201280077356.4; dated May 2, 2017; 7pages.

* cited by examiner

REGULATING APPLICATION TASK DEVELOPMENT

BACKGROUND

For purposes of developing an application, various tasks related to developing features of the application may be assigned to different programmers and programming teams. For example, a given programming team may be assigned a task of creating a login feature for the application, and another programming team may be assigned a task of creating a user search feature for the application. Although the tasks may be assigned to multiple programming teams, the progress of a given task may affect the progress of one or more of the other tasks, as various features of the application may be directly or indirectly related to each other.

DETAILED DESCRIPTION

Figure 1:
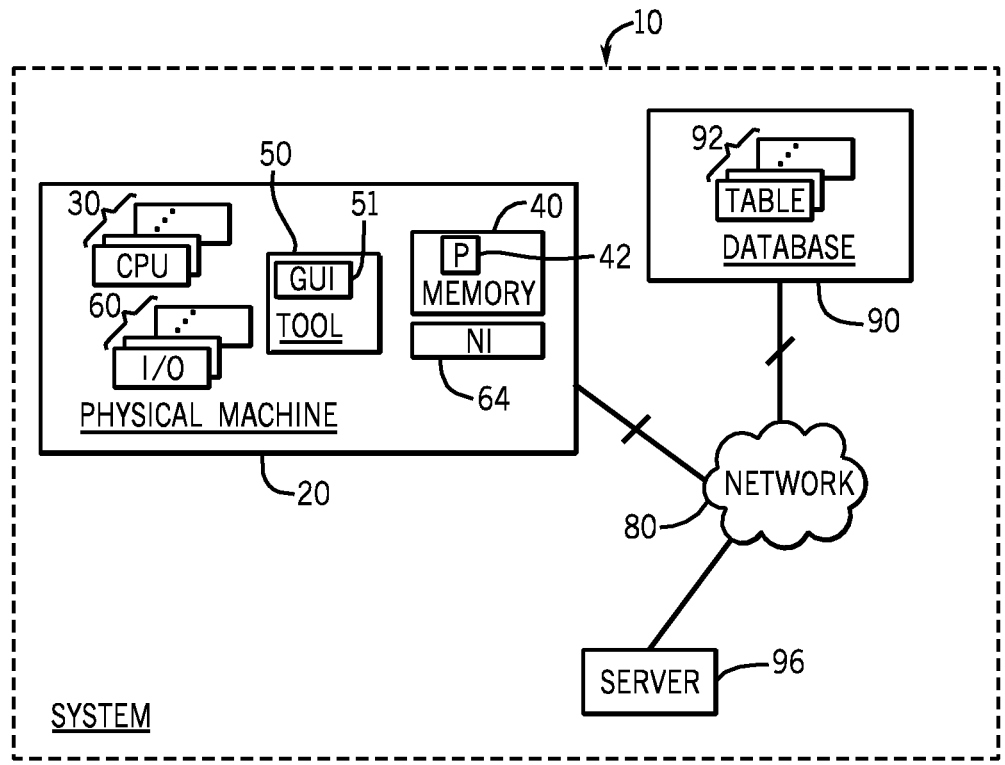
FIG. 1 is a schematic diagram of a computer system according to an example implementation.

Techniques and systems are disclosed herein for purposes of tracking and managing the development of a given application, such as an Internet-based (or "online") application or an application on a private cloud, as examples. In particular, in accordance with techniques and systems that are disclosed herein, a tool is disclosed, which enhances the management and monitoring, or tracking, of various tasks associated with application development.

More specifically, in accordance with example implementations that are disclosed herein, the development of the features for a given application may be subdivided into tasks, which are also referred to as "spiral items" herein. In accordance with example implementations, each spiral item is associated with a goal and a measurable, current state, which may be compared to the goal at times for purposes of assessing the current progress of the spiral item.

For example, developing a login feature for the application may be a particular spiral item that has a measurable goal (a goal of processing a user login in four or less seconds, for example) and which may, at any given point in the development of the application, have a current login time (i.e., the measurable state) that is less or more than the goal (the assessment). As another example, another spiral item might be "program code coverage," which relates to a task of testing, the overall application and has a measurable state in terms of a percentage of the application that has been tested. In other words, the program code coverage specifies how many program states, program conditions, user inputs, and so forth, have been tested for purposes of verifying proper operation of the application.

Some of the spiral items may be described by associated "spiral stories." For example, the above-mentioned example spiral item of developing a user login feature may have an associated description, or spiral story, of being a "login." As another example, a spiral item that is directed to processing a user search on an online catalog, which results in one page of search results may be described by the spiral story: "filter product list result having one page."

The current state of a given spiral item may be measured many times while development of feature(s) corresponding to the item and the development of the application, in general, are progressing. In this manner, the development of the application may be viewed in time as occurring in "sprints." In general, a sprint is a defined time slice, or time segment, of the application development process associated with the concurrent development of one or more of the spiral items. As examples, a sprint may be associated with a fixed unit of time (a week, a month, a quarter, and so forth); or unit of time whose duration of time is defined by a performance or some other variable. In general, after the conclusion of a given sprint, the current states of the spiral items may be measured. For example, program code coverage (i.e., extent of testing efforts) may be a particular spiral item, and the state of the code coverage may be measured after each sprint (the code coverage is 67% after three sprints, for example).

Thus, a further characteristic of the spiral item, in accordance with example implementations, is that the development of the spiral item occurs across one or multiple sprints. Due to this time progression-based development, a given spiral item may change significantly over time due to program code changes and the addition of new and/or different features in the spiral item and in other spiral items. In many cases, achieving initial, or original, goals for the spiral items may be challenging; and as a consequence, robust application development may involve many changes and "fine tuning" of the goals, as well as changes to relative priorities that are assigned to the spiral items, as disclosed herein.

Referring to FIG. 1, in accordance with example implementations that are disclosed herein, a processor-based tool 50 is constructed to perform calculations and display indicators for purposes of allowing a programming team to regulate application task development, i.e., manage and track tasks, or spiral items, for purposes of developing an application. In this manner, as described herein, the tool 50 contains an interface, such as an example graphical user interface (GUI) component 51 that receives data indicating, or representing, user input (goals for spiral items, weights of importance for spiral items, descriptions of spiral items, and so forth) for spiral items to be tracked and be managed; and the GUI component 51 of the tool 50 generates various indicators, such as tables, charts, graphs, and so forth, that are displayed (on an input/out (I/O) device 60, for example) for purposes of allowing an application development team to track and manage spiral item/application development progress.

As a specific example, based on user input, the tool 50 may generate and display (on a monitor display, for example) the following spiral story table, which, as its name implies, describes the current spiral stories in the development of an example application for an online, "or web"-based store:

TABLE 1

| USER STORY ID | USER STORY DESCRIPTION |
| --- | --- |
| 1 | As a user I want to login to the web store |
| 2 | As a user I want to see a list of products |
| 3 | As a user I want to filter the list of products |
| 4 | As a user I want to logout |

In Table 1, "USER STORY ID" is a key used to identify a particular spiral story. For example, USER STORY ID=1 identifies a spiral story that describes an associated spiral item to develop a login to the store. As another example, USER STORY ID=3 identifies a spiral story associated with a spiral item for filtering a list of products.

Given the above-described example spiral story table, the tool 50 may be used to generate the following spiral item table for purposes of tracking and managing the spiral items:

TABLE 2

| SPIRAL ITEM ID | USER STORY ID | Description | Goal | Weight | Type | Status |
| --- | --- | --- | --- | --- | --- | --- |
| 1 | 1 | Login | 4 | 10 | Performance | inactive |
| 2 | 2 | See product list | 2 | 9 | Performance | inactive |
| 3 | 3 | Filter product list result have one page | 2 | 8 | Performance | inactive |
| 4 | 3 | Filter product list result having more than one page | 3 | 8 | Performance | inactive |
| 5 | 4 | logout | 1 | 4 | Performance | inactive |
| 6 | | Code coverage | 90% | 1 | Code coverage | inactive |

In this table, the "SPIRAL ITEM ID" key identifies a given spiral item to track, or monitor. These spiral items may be associated with spiral stories, as well as additional items that do not have a specific USER STORY ID key, such as program code coverage (see the last row of Table 2, for example). Table 2 contains a goal key, which specifies a GOAL for the corresponding spiral item. For example, the SPIRAL ITEM ID=1 identifier corresponds to the login spiral story and has a goal of "4," which, for this example, is the desired maximum number of seconds for a user to wait before logging into the application.

Table 2 also contains a WEIGHT key, which indicates how important a particular spiral item is relative to the other spiral items. As set forth in Table 2, each of the spiral items has an associated weight, with the greater weight for this example being of greater importance. Thus, for Table 2, SPIRAL ITEM ID=1 corresponds to the login spiral story and has the greatest weight in Table 2 of "10"; and for this example, the SPIRAL ITEM ID=6, which corresponds to the code coverage has the lowest weight of "1." Therefore, for this example, the login spiral story has been designated by user input as having the greatest priority, and the program code coverage has been designated by user input as having the lowest priority.

Table 2 further specifies a TYPE key, which indicates the type of spiral item. In this manner, spiral items 1 through 5 correspond to performance items, whereas spiral item number 6 corresponds to code coverage.

Finally, the STATUS key of Table 2 indicates the corresponding status of the spiral item. For the example shown above, each of the spiral items is "inactive," as the items have not been fully developed and are not currently accessible, for example, by end application users as part of the developed application. The status may be inactive, active or changed, in accordance with example implementations.

A spiral item table, such as example Table 2 above, may be augmented to include additional keys and corresponding additional columns, in accordance with further implementations, as application development progresses. For example, as further disclosed herein, in accordance with some implementations, the spiral item table may also contain a RANK key, which specifies a calculated priority rank for each spiral item.

After several sprints, the GUI component 51 of the tool 50 may be used to generate the following spiral item result table:

TABLE 3

| SPIRAL ITEM RESULT ID | SPIRAL ITEM ID | DATE | SPRINT ID | VALUE |
| --- | --- | --- | --- | --- |
| 1 | 1 (Login) | 01.01.12 | 7 | 6 |
| 2 | 2 (See product list) | 01.01.12 | 7 | 3.5 |
| 3 | 3 (Filter one page) | 01.01.12 | 7 | 3 |
| 4 | 4 (Filter many pages) | 01.01.12 | 7 | 3.5 |
| 5 | 5 (logout) | 01.01.12 | 7 | 3.5 |
| 6 | 6 (code coverage) | 01.01.12 | 7 | 82 |

In Table 3, a SPRINT ID field denotes the corresponding number of sprints; and a VALUE key represents the measured metrics, or values, for associated spiral items. Each measured value indicates the progress of each associated spiral item relative to its goal. For example, for the SPIRAL ITEM RESULT ID=1, the corresponding login spiral item has a value of "6," which indicates that after seven sprints, the login time is six seconds. As another example, for the SPIRAL ITEM RESULT ID=4, the corresponding spiral item relating to the story to filter multiple pages has a value of "3.5," which indicates 3.5 seconds to filter a list result having more than one page. As can be seen from Table 3, the goal for the multiple page filtering is three seconds. As yet another example, as depicted in Table 3, the code coverage spiral item has a measured value of "82," which indicates a program code coverage of "82%" after seven sprints.

Still referring to FIG. 1, in accordance with implementations disclosed herein, the tool 50 may be formed by the execution of machine executable instructions on a physical machine 20. In other words, the tool 50, as well as the interface component 51, may contain one or multiple processors (one or multiple central processing units (CPUs), for example), which execute machine executable instructions to cause the tool 50 and interface component 51 to perform as disclosed herein. Thus, through the execution of these instructions, the above-described tables and/or other indicators may be determined and generated, which that permit an application development team (having one or more users of the tool 50) to manage and track spiral items relating to the development of an application.

In general, the physical machine 20 is an actual machine that is made up of actual hardware and software. In this manner, the physical machine 20 may include one or multiple central processing units (CPUs) 30, which execute program instructions 42 that are stored in a memory 40 for purposes of creating the tool 50 to manage and track the spiral items. The memory, in general, is a non-transitory storage medium that is formed from such devices as semiconductor devices, magnetic media, optical media, removable media, combinations of such media, and so forth.

As further examples of the hardware of the physical machine 20, the physical machine 20 may include various input/output (I/O) devices 60, such as a display monitor to display task-related indicators, such as the example indicators that are disclosed herein; and a keyboard, a mouse, a pointing device, and so forth, for purposes of receiving user data to regulate task development, weight task development, prioritize tasks, assess tasks, enter measurements and so forth, as disclosed herein. Moreover, the physical machine 20 may include at least one network interface 64 for purposes of communicating with a network 80, in accordance with some example implementations.

In general, the physical machine 20 may be a portable computer, an ultrabook computer, a tablet computer, a desktop computer, a client, a server, a smartphone, and so forth, depending on the particular implementation.

For the example of FIG. 1, the physical machine 20 may be part of a system 10 to develop an application, such as an application to be migrated to a server 96. However, the application that is developed through the use of the physical machine 20 and tool 50 may be developed on multiple physical machines and may be used on machines not depicted in FIG. 1, such as a machine or multiple machines on a separate network. Thus, many implementations are contemplated, which are within the scope of the appended claims.

For the specific example depicted in FIG. 1, the physical machine 20 may communicate over the network 80 with a database 90, which stores various files and tables 92. As examples, these tables 92 may be relational database tables, such as specific tables 92 that are depicted in FIG. 2.

Figure 2:
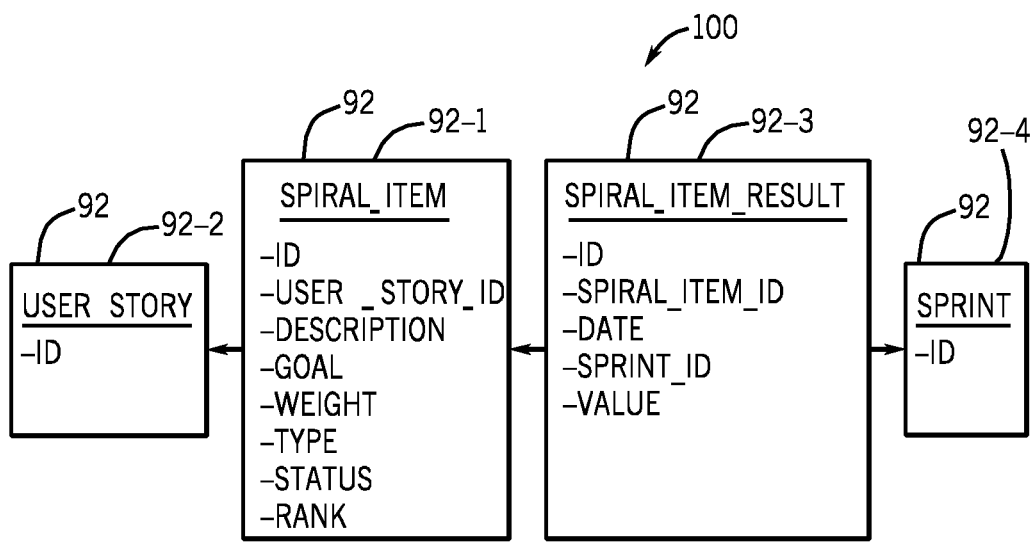
FIG. 2 is an illustration of database schema according to an example implementation.

Referring to FIG. 2 in conjunction with FIG. 1, in accordance with example implementations, the tables 92 include a spiral item table 92-1, which is set forth in an example in Table 2 above. In general, the spiral item table 92 describes the goals, weights, types and descriptions of the spiral items, as described above. In this manner, the spiral item table 92-1 may contain such keys as an IDENTIFIER key, which may serve as the primary key for the table 92-1; a USER STORY ID key that identifies a user story; a DESCRIPTION key that identifies the corresponding description for the spiral item; a GOAL key that identifies a goal (seconds, percentage of code coverage, and so forth) for the associated spiral item; a WEIGHT key that identifies a relative priority, user-assigned weight for the spiral item; a TYPE key that identifies a type of goal for the spiral item; a STATUS key, which identifies the status of the spiral item; and a RANK key, which identifies a priority rank, as calculated by the tool 50. The ID key of the spiral item table 92-1 may be further used to access a user story table 92-2, such as exemplary Table 1 above, which is indexed by a primary ID key for the descriptions of the user stories.

It is noted that not all of the spiral items of the spiral item table 92-1 may be user stories. The ID key may further be used to access a spiral item result table 92-3, such as exemplary Table 3 above, which has the ID, SPIRAL ITEM ID, DATE, SPRINT ID and VALUE keys. Finally, as depicted in FIG. 2, the tables 92 may further include a sprint table 92-4, which is indicated by a PRIMARY ID key for purposes of describing the spiral items by sprint.

In accordance with example implementations, the tool 50 (see FIG. 1) takes into account the goal and weight associated with a given spiral item for purposes of determining a rank of the spiral item. The tool 50 may therefore receive data via the GUI interface component 51 indicative of the goal and weight of the given spiral item. More specifically, in accordance with example implementations, the tool 50 calculates a difference between the goal and measured metric value for a given spiral item; and using this difference, the tool 50 calculates a corresponding ranking of the spiral item. By analyzing the relative rankings, or priorities, of the spiral items, a user may manage and therefore, determine which spiral items receive greater priority in the next sprint.

As a more specific example, the tool 50 may generate the following spiral item table after several sprints:

TABLE 4

| SPIRAL ID | STORY ID | Description | Goal | Wt. | Type | Status | Rank |
|---|---|---|---|---|---|---|---|
| 1 | 1 | Login | 4 | 10 | Performance | active | (6 − 4)*10 = 20 |
| 2 | 2 | See product list | 2 | 9 | Performance | active | (3.5 − 2)*9 = 13.5 |
| 11 | | Code coverage | 90% | 1 | Code coverage | active | (90 − 82)*1 = 8 |
| 3 | 3 | Filter product list result have one page | 2 | 8 | Performance | active | (3 − 2)*8 = 8 |
| 4 | 3 | Filter product list result have more than one page | 3 | 8 | Performance | active | (3.5 − 3)*8 = 4 |
| 10 | 7 | logout | 1 | 4 | Performance | active | (3.5 − 1)1 = 2.5 |

As can be seen from Table 4, in accordance with example implementations, the tool 50 arranges the spiral items in row order according to rank. More specifically, for the example of Table 4, the highest ranked spiral item appears in the first row and the lowest ranked spiral item appears in the last row. Thus, for the login spiral item, the tool 50 calculates a rank of "20," which is derived by the difference of the measured login time (six seconds) less the goal of four seconds multiplied by the weight of "10." As a comparison, the lowest ranked spiral item, which pertains to the logout task, has a rank of "2.5," which corresponds to the product of a weight of "1" and the difference of the measured logout time of 3.5 seconds less the goal logout time of 1 second.

It is noted that the above-described calculation performed by the tool 50 is merely an example, as the actual calculation may vary according to user-configurable parameters. For example, when calculating performance tasks, the equation might be (current result-goal result)*weight. However, when performing the calculation for program code coverage, the equation might be different: (goal result-current result) *weight. Moreover, other ways may be used to calculate the rank, using the goal, current and weight fields, depending on the particular implementation and user selectable parameters. Thus, in general, the calculation of the rank may be defined in many different ways for a specific type of spiral item, with the ranks of the spiral items having the same associated type (a performance type, for example) being performed using the same calculation and with the spiral items of a different type (a program code coverage type, for example) being performed using a different calculation.

Thus, the tool 50 indicates a spiral backlog with items prioritized according to result and weight. By analyzing this table, a development team may readily ascertain the more important performance issue, such as the most important performance issue for this example is the login feature and the least important performance issue, which for this example is the logout feature. This means that for purposes of achieving the best return on investment, the team works on the items according to the ranking in the above-described table.

The weights that are assigned to the spiral items may change over time. For example, the development team may decide that the logout feature should be assigned a greater weight, i.e., more importance. If this occurs, the team may change the weight of the logout from "1" to "9," which causes the tool 50 to regenerate the spiral backlog table as follows:

TABLE 5

| Spiral Id | Story id | Description | Goal | Wt | Type | Status | Rank |
|---|---|---|---|---|---|---|---|
| 10 | 7 | Logout | 1 | 9 | Performance | active | (3.5 − 1)*9 = 22.5 |
| 1 | 1 | Login | 4 | 10 | Performance | active | (6 − 4)*10 = 20 |
| 2 | 2 | See product list | 2 | 9 | Performance | active | (3.5 − 2)*9 = 13.5 |
| 11 | | Code coverage | 90% | 1 | Code coverage | active | (90 − 82)*1 = 8 |
| 3 | 3 | Filter product list result have one page | 2 | 8 | Performance | active | (3 − 2)*8 = 8 |
| 4 | 3 | Filter product list result have more than one page | 3 | 8 | Performance | active | (3.5 − 3)*8 = 4 |

As can be seen from Table 5, the logout spiral item is now ranked as having the top priority, due in part to the relatively high assigned weight of "9."

As a further example, assuming that in a further one or multiple sprints, additional work was done on the logout spiral item and the new logout time is two seconds, the tool 50 may create the following spiral backlog table:

TABLE 6

| Spiral Id | Story Id | Description | Goal | Wt | Type | Status | Rank |
|---|---|---|---|---|---|---|---|
| 1 | 1 | Login | 4 | 10 | Performance | active | (6 − 4)*10 = 20 |
| 2 | 2 | See product list | 2 | 9 | Performance | active | (3.5 − 2)*9 = 13.5 |
| 10 | 7 | logout | 1 | 9 | Performance | active | (2 − 1)*9 = 9 |
| 11 | | Code coverage | 90% | 1 | Code coverage | active | (90 − 82)*1 = 8 |
| 3 | 3 | Filter product list result have one page | 2 | 8 | Performance | active | (3 − 2)*8 = 8 |
| 4 | 3 | Filter product list result have more than one page | 3 | 8 | Performance | active | (3.5 − 3)*8 = 4 |

As can be seen from this example, the logout feature spiral item has been moved from the top priority item to having the third highest priority due to the reduction of the logout time. Moreover, as can be seen from Table 6, the development team may now determine, based on the table, that the most important item to work on is the login feature spiral item.

Figure 3:
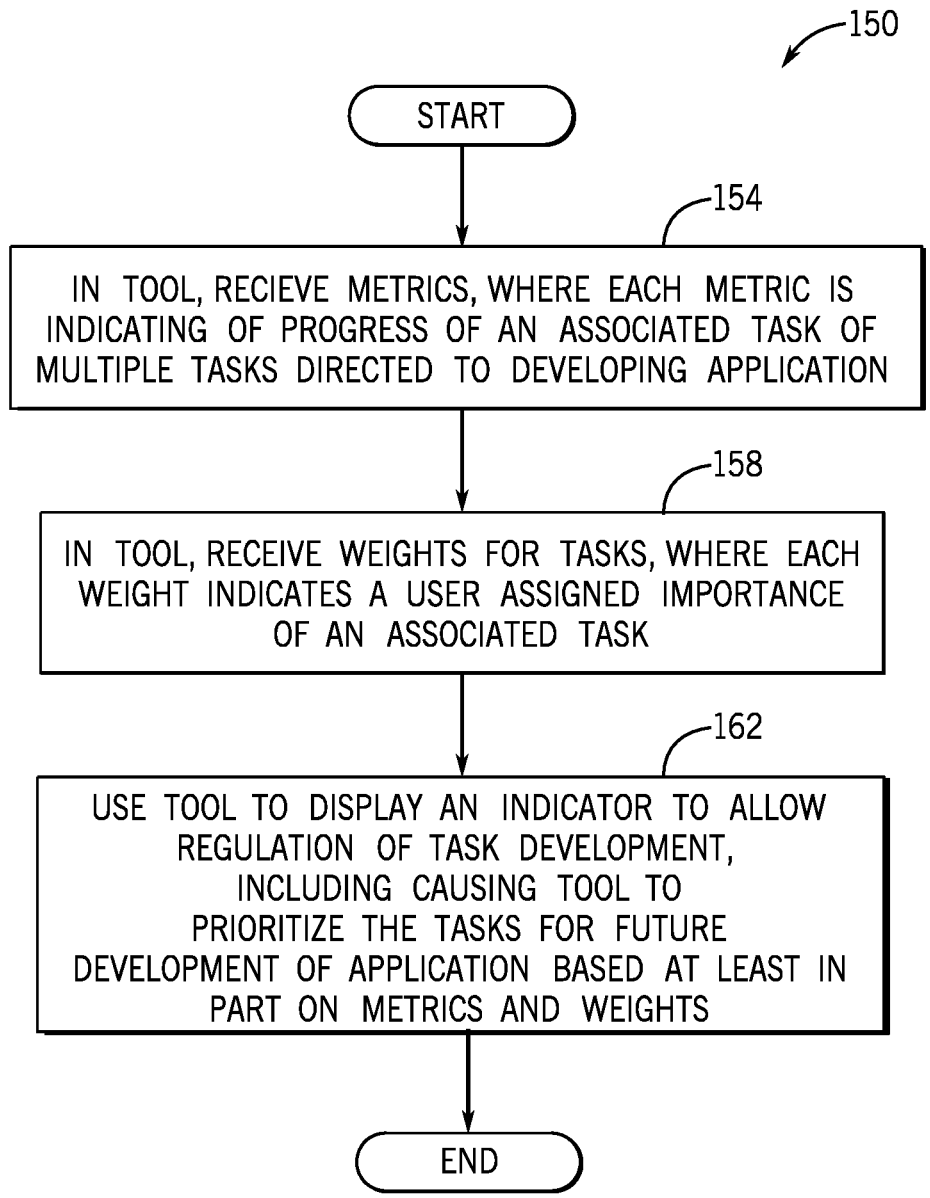
FIG. 3 is a flow diagram depicting a technique to manage tasks related to developing an application according to an example implementation.

Referring to FIG. 3, thus, in accordance with example implementations, a technique 150 includes in a tool, receiving (block 154) metrics, where each metric is indicative of the progress of an associated task of multiple tasks directed to developing an application. Pursuant to the technique 150, weights are also received in the tool for tasks, where each weight indicates a user assigned important of an associated task, pursuant to block 158. The tool may then be used, pursuant to block 162, to display one or multiple indicators to allow regulation of task development, including causing the tool to prioritize the tasks for future development of the application based at least in part on the metrics and the weights. In accordance with example implementations, the technique 150 includes receiving the data indicative of the metrics and weights in an interface of the physical machine 20 (see FIG. 1), such as receiving the data in the GUI interface component 51, for example.

In further implementations, the tool 50 may generate tables or other management charges, graphics and so forth other than the above-described tables for purposes of allowing the management team to monitor and track progress of the spiral items. For example, in accordance with some implementations, the tool 50 may generate a graph per spiral item or spiral item type, which represents the progress of the item/type over time. For example, the tool 50 may generate the following table, which represents the program code coverage value over time:

TABLE 7

| Sprint | Date | Value |
|---|---|---|
| 1 | 01.01.12 | 30 |
| 2 | 01.02.12 | 32 |
| 3 | 01.03.12 | 35 |

TABLE 7-continued

| Sprint | Date | Value |
|---|---|---|
| 4 | 01.04.12 | 50 |
| 5 | 01.05.12 | 57 |
| 6 | 01.06.12 | 67 |
| 7 | 01.07.12 | 72 |

As can be seen from Table 7, the values generally increase over time, or with sprint number. Thus, by analyzing the table, the development team may determine that progress is being made pertaining to the code coverage, a coverage that may be affected by work on other spiral items in a given sprint.

Figure 5:
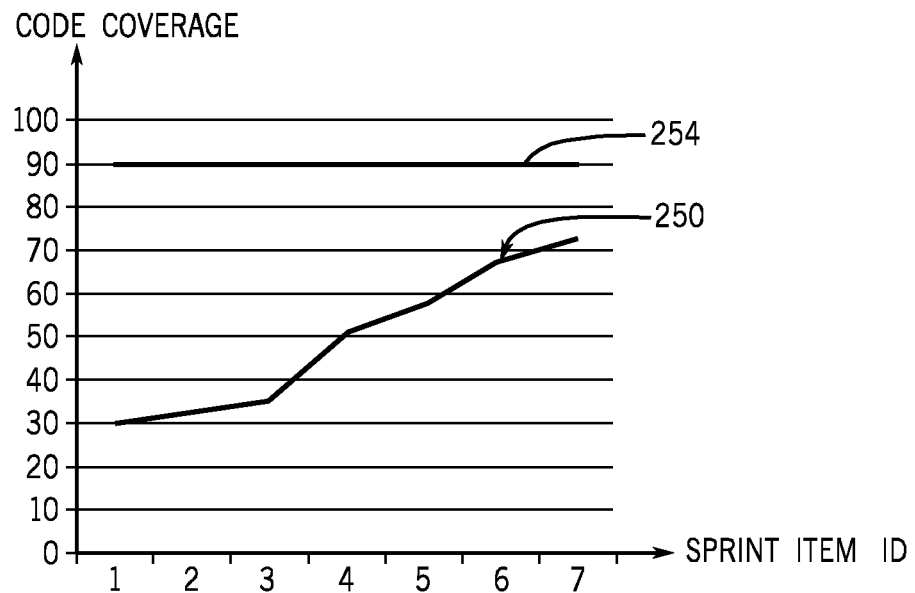
FIG. 5 is a chart depicting a program code coverage over time according to an example implementation.

As another example, FIG. 5 depicts a graph 250 of the code coverage (as set forth in Table 7), which may further displayed by the tool 50, in accordance with example implementations. For this example, FIG. 5 also depicts a horizontal line 254, which indicates the desired code coverage of 90%. It is noted that the code coverage may not necessarily a constant value, as it may be subject to change by the development team over the development cycle of the application.

As yet another example, the tool 50 may generate a table, which represents the total, or summation, of all of the ranks of the spiral items, or a selected group of the spiral items for purposes of providing a measure of the overall progress of the application development. In this manner, the development team may use this table to track the progress of the performance of the application over time in order to obtain a sense of the new version improved or whether the application development is progressing. This table may be a function of sprint number or may be a function of a release number, depending on the particular implementation. As a more specific example, the tool 50 may generate the following table:

TABLE 8

| Release | Value |
|---------|-------|
| 1       | 250   |
| 2       | 205   |
| 3       | 215   |
| current | 172   |

Figure 6:
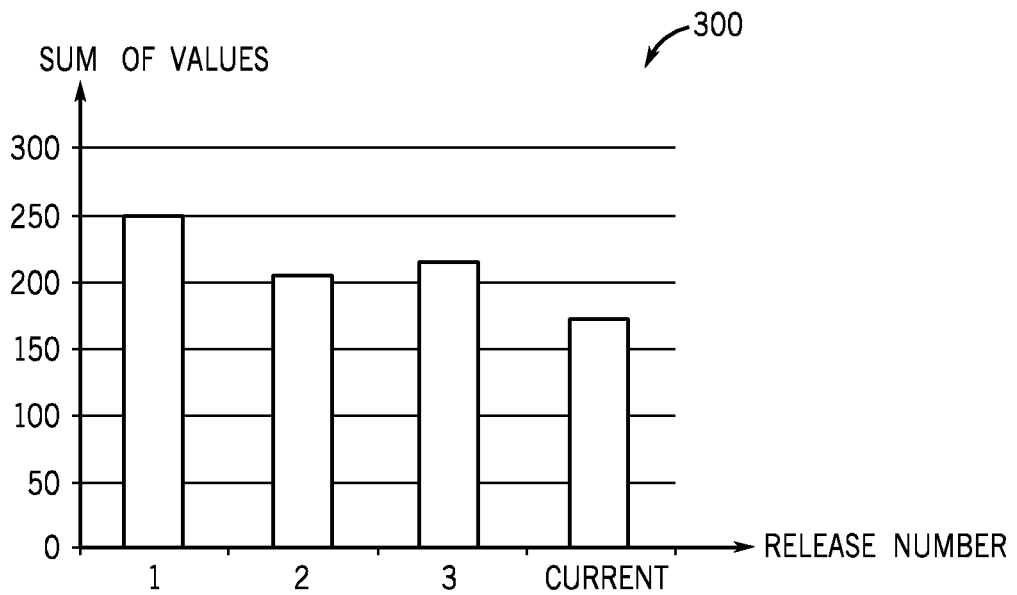
FIG. 6 is a bar chart depicting a summation of ranking values over time according to an example implementation.

As can be seen from the example of Table 8, in the current release, the value is less than the previous releases, thereby indicating overall progress. It is noted that between release numbers 2 and 3, the value increased, indicating that performance does not always increase from release to release. Graphically, FIG. 6 depicts a bar chart 300 showing a summation of ranking values by release number.

Figure 4:
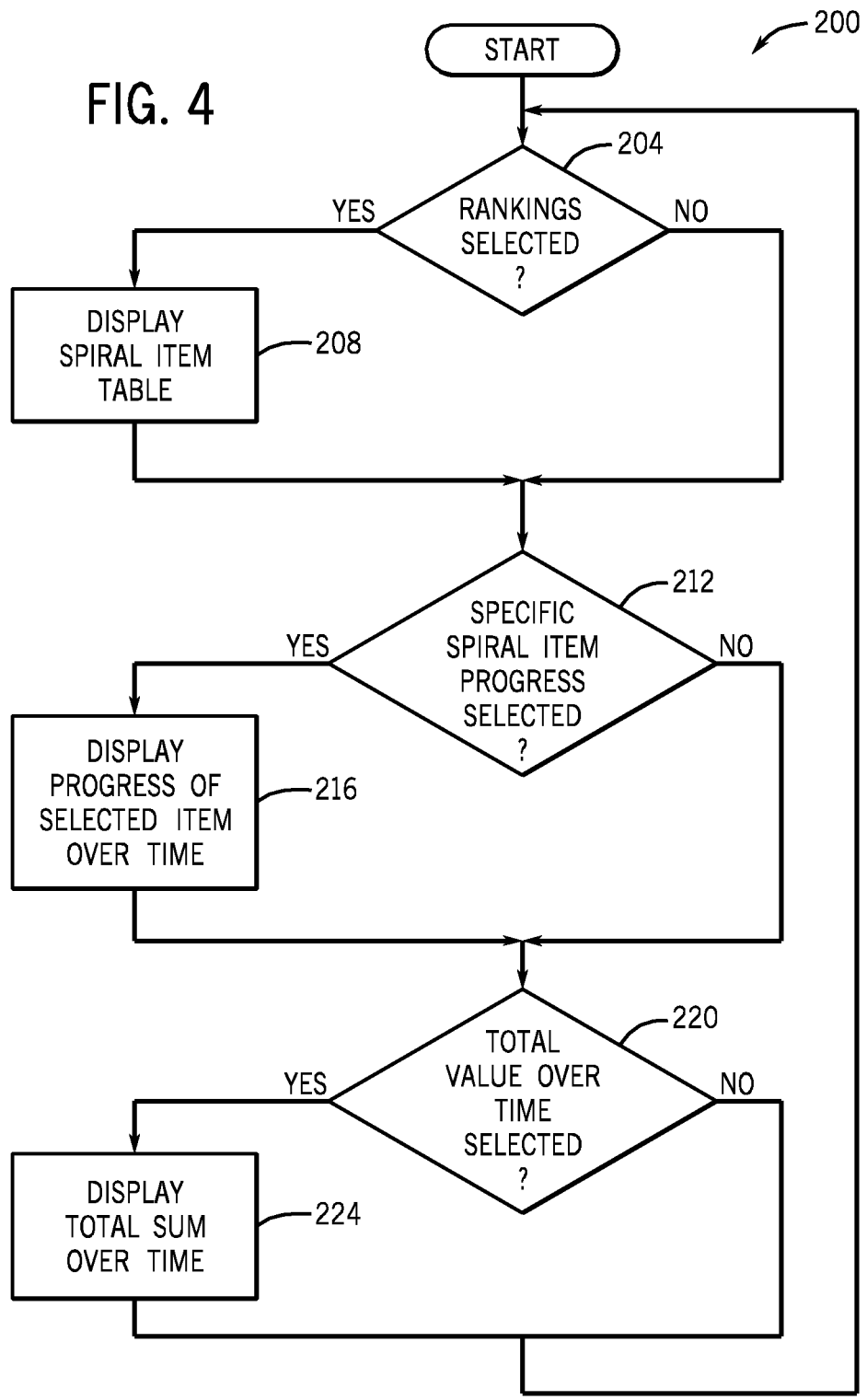
FIG. 4 is a flow diagram depicting the processing of performance measures according to an example implementation.

Thus, referring to FIG. 4, in accordance with example implementations, the tool 50 may provide a variety of different progress indications and/or reports that may be used to monitor and track the development of a given application. Pursuant to the technique 200, the tool 50 determines (decision block 204) whether the rankings are selected and if so, displays (block 208) the spiral item result table. If the tool 50 determines (decision block 212) that a specific spiral item progress is selected, then the tool 50 may display (block 216) a progress of the selected item over time. If the tool 50 determines (decision block 220) that the total value over time is selected, then the tool 50 may display (block 224) the total sum over time. Thus, many variations are contemplated, which are within the scope of the appended claims.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   in a tool comprising a processor, receiving a plurality of metrics for a plurality of tasks associated with developing an application, wherein each task of the plurality of tasks is executed to develop an associated feature of the application, and each of the metrics of the plurality of metrics being associated with one of the tasks and representing a result produced by the associated task by ongoing execution of the associated task, wherein a given metric of the plurality of metrics represents a measure of a current performance of the feature being developed by the task associated with the given metric relative to a predetermined performance goal for the feature;
   in the tool, receiving weights, each weight of the weights being associated with the one of the tasks and indicating a user assigned importance of the associated task; and
   displaying with the tool an indicator to allow regulation of task development, the displaying including causing the tool to prioritize future execution of the plurality of tasks for future development of the application based at least in part on the plurality of metrics and the weights.

2. The method of claim 1, wherein the given metric represents a difference between the predetermined performance goal and the current performance of the feature.

3. The method of claim 1, wherein causing the tool to prioritize the tasks comprises:
   for each task of the plurality of tasks, determining a difference between a goal for the associated metric and a progress indicated by the associated metric; and
   for each task of the plurality of tasks, determining an associated ranking of the task based at least in part on the difference and the associated weight.

4. The method of claim 1, wherein at least one of the tasks is refined in a plurality of iterations to develop the application, the method further comprising:
   displaying the indicator to allow a progress of the metric to be tracked over the plurality of iterations.

5. The method of claim 1, wherein the tasks are refined in a plurality of iterations to develop the application, the method further comprising:
   for each iteration, determining an aggregate value for the metrics; and
   displaying the indicator to allow the aggregate value of the plurality of iterations to be tracked over time.

6. A system comprising:
   an interface to receive data indicative of a plurality of metrics and a plurality of tool weights, wherein a plurality of tasks are associated with developing an application, each task of the plurality of tasks is executed to develop an associated feature of the application, and each of the metrics of the plurality of metrics is associated with one of the tasks and represents a result produced by the associated task by ongoing execution of the associated task, and each tool weight of the plurality of tool weights is associated with the one of the tasks of the plurality of tasks and indicates a user assigned importance of the associated task, wherein a given metric of the plurality of metrics represents a measure of a current performance of the feature being developed by the task associated with the given metric relative to a predetermined performance goal for the feature; and
   a tool comprising a processor to provide an indicator to allow regulation of task development, the tool being adapted to prioritize future execution of the plurality of tasks for future development of the application based at least in part on the metrics and the plurality of tool weights.

7. The system of claim 6, wherein the given metric represents a difference between the predetermined performance goal and the current performance of the feature.

8. The system of claim 6, wherein the plurality of tasks are refined in a plurality of iterations to develop the application, the tool being further adapted to:
- for each iteration, determine an aggregate value for the plurality of metrics; and
- generate an indicator to track the aggregate value of the plurality of iterations.

9. An article comprising a non-transitory storage medium to store instructions that when executed by a computer cause the computer to:
- receive a plurality of metrics for a plurality of tasks associated with developing an application, wherein each task of the plurality of tasks is executed to develop an associated feature of the application, and each of the metrics of the plurality of metrics being associated with one of the tasks of the plurality of tasks and representing a result produced by the associated task by ongoing execution of the associated task, wherein a given metric of the plurality of metrics represents a measure of a current performance of the feature being developed by the task associated with the given metric relative to a predetermined performance goal for the feature;
- receive weights, each weight of the weights being associated with one of the tasks of the plurality of tasks and indicating a user assigned importance of the associated task; and
- generate at least one indicator to regulate task development, the at least one indicator to prioritize future execution of the plurality of tasks for future development of the application based at least in part on the plurality of metrics and the weights.

10. The article of claim 9, wherein the given metric represents a difference between the predetermined performance goal and the current performance of the feature.

* * * * *